United States Patent [19]  [11] 4,185,044
Tacke et al.  [45] Jan. 22, 1980

[54] FLAME-PROOFED UNREINFORCED AND UNFILLED POLYAMIDE MOULDING COMPOSITIONS

[75] Inventors: Peter Tacke; Dieter Neuray; Dietrich Michael, all of Krefeld, Fed. Rep. of Germany

[73] Assignee: Bayer Aktiengesellschaft, Fed. Rep. of Germany

[21] Appl. No.: 927,859

[22] Filed: Jul. 25, 1978

[30] Foreign Application Priority Data

Dec. 7, 1977 [DE] Fed. Rep. of Germany ....... 2754491

[51] Int. Cl.² .................... C08G 8/08; C08G 69/46; C08K 3/02
[52] U.S. Cl. ..................... 525/1; 260/37 N; 260/38; 260/45.7 P; 260/45.7 R; 260/45.75 B; 260/45.75 W; 260/45.85 R; 525/2; 525/4
[58] Field of Search ..... 260/45.7 PE, 841 (U.S. only)

[56] References Cited

U.S. PATENT DOCUMENTS

| | | |
|---|---|---|
| 2,378,667 | 6/1945 | Vaala ................................. 260/841 |
| 3,778,407 | 12/1973 | Hild et al. ...................... 260/45.7 PE |
| 3,806,488 | 4/1974 | Stone et al. ................... 260/45.7 PE |
| 3,808,289 | 4/1974 | Okuhashi et al. ................ 264/210 F |
| 3,847,861 | 11/1974 | Largman et al. ............. 260/45.7 PE |
| 3,878,162 | 4/1975 | Breitschaft ................... 260/45.7 PE |
| 3,931,081 | 1/1976 | Dany et al. .................... 260/45.95 L |
| 3,951,908 | 4/1976 | Kaiser et al. ................. 260/45.7 PE |
| 4,067,897 | 1/1978 | Ducloux ....................... 260/45.7 PE |
| 4,092,284 | 5/1978 | Theysohn et al. ................ 260/37 N |
| 4,110,277 | 8/1978 | Economy et al. ..................... 260/841 |

OTHER PUBLICATIONS

Kirk-Othmer, "Encyclopedia of Chemical Technology", vol. 8, 1965, pp. 306 and 307.

*Primary Examiner*—Hosea E. Taylor
*Assistant Examiner*—R. A. White
*Attorney, Agent, or Firm*—Connolly and Hutz

[57] ABSTRACT

Flame-proofed, unreinforced unfilled polyamide moulding compositions containing as a flame-proofing combination a mixture of a phenol/aldehyde condensation resin and red phosphorus.

9 Claims, No Drawings

FLAME-PROOFED UNREINFORCED AND UNFILLED POLYAMIDE MOULDING COMPOSITIONS

This invention relates to flame-proofed, unreinforced and unfilled polyamide moulding compositions which contain a combination of powdered red phosphorus and phenol/aldehyde resin as a flame-proofing agent.

It is known from German Auslegeschrift No. 1,931,387 = British Pat. No. 1305121) that red phosphorus is a very powerful flame-proofing agent for glass fibre reinforced polyamides, although it has no flame-proofing action on unreinforced polyamides, and even accelerates burning.

Additionally the use of red phosphorus as a flame-proofing agent for polyamide moulding compositions also has the following disadvantages:

1. Under the high temperatures normally used (above 250° C.) for processing the commercially most important aliphatic polyamides (PA-6 and -6,6), highly toxic and malodorous phosphorus-hydrogen compounds are formed.

2. Owing to the red colour of phosphorus and the high concentrations of red phosphorus necessary for producing flame-proofed polyamide moulding compositions, the production of flame-proofed light coloured moulding compositions is difficult or even impossible.

Numerous attempts have been made to overcome these disadvantages.

Thus according to German Offenlegungsschrift No. 2,308,104 (=U.S. Pat. No. 3883475), heavy metal compounds, e.g. $MoS_2$, HgO, PbO or CuO may be added to thermoplasts which have been flame-proofed with red phosphorus in order to reduce the formation of $PH_3$. These metal compounds, however, are mostly toxic and dark in colour.

In German Auslegeschrift Nos. 2,625,673 and 2,625,691, it is attempted to prevent evolution of $PH_3$ by encapsulating the red phosphorus with phenol/aldehyde polycondensates. With the known compositions of flame-proofing agents, however, consisting mainly of red phosphorus, it is impossible to produce sufficiently flame-proofed, lightly coloured polyamide moulding compositions owing to the intense colour of the phosphorus.

It has now been surprisingly found that the flame proof characteristics at least equal to those obtained with the flame-proofing agents having a much higher phosphorus content described in German Auslegeschrift Nos. 2,625,673 and 2,625,691 can be obtained in unreinforced and unfilled polyamide moulding compositions by increasing the proportion of phenol/aldehyde resins and at the same time drastically reducing the phosphorus content.

Reduction of the phosphorus content not only reduces the risk of $PH_3$ formation, but also enables flame-proofed, lightly coloured polyamide moulding compositions to be produced.

The powerful synergistic action of phenol/aldehyde resins as flame-proofing agents with red phosphorus is particularly surprising in view of the fact that these resins are readily combustible when used on their own and have to be made flame resistant by the addition of flame-proofing agents.

The present invention relates to flame-proofed, unreinforced and unfilled polyamide moulding compositions, containing, as a flame-proofing combination, from 0.5 to 25% by weight, preferably from 3 to 12% by weight, based on the total moulding composition, of a mixture of:

(a) from 55 to 95% by weight, preferably from 60 to 80% by weight of phenol/aldehyde resins and
(b) from 5 to 45% by weight, preferably from 20 to 40% by weight of a red phosphorus having an average particle size below 200 um.

Phenol/aldehyde resins which may be used for the purpose of this invention are resins obtained by polycondensing phenols and formaldehyde and/or acetaldehyde which soften within the range of from −30 to 350° C. and have preferably been condensed in an acid medium.

The following are examples of phenolic compounds from which the resins may be prepared: phenols, n- and iso-alkyl-phenols having up to 8 carbon atoms in the side chains, naphthols, hydroxydiphenyls, hydroxydiphenyl ether, pyrocatechol, resorcinol, hydroquinone, bis-(hydroxy-phenyl)-alkanes and/or -cycloalkanes having up to 20 carbon atoms, bis-(hydroxyphenyl)-sulphides, bis-(hydroxyphenyl) -sulphones and hydroxybenzoic acids.

The phenol/aldehyde condensation resins can be prepared using known methods, for example as described in Houben-Weyl, Methoden der organischen Chemie, Volume 14/2, 4th Edition, page 273 et seq.

The molar ratio of aldehyde to phenolic compound is generally within the range of from 0.3 to 1.2, preferably from 0.5 to 0.9. Novolaks obtained by acid condensation are preferably used.

The phenol/aldehyde resin may be cross-linked to increase its melt viscosity, for example with boric acid, phosphoric acid or phosphorus acid, esters of phosphorus and phosphoric acid, polybasic carboxylic acids, polyfunctional isocyanates, polyfunctional epoxides or $PCl_3$. Up to 25% by weight based on the resin of cross-linking agent may be added to the resin. Cross-linking with polyfunctional epoxides, phosphoric acid and boric acid is particularly effective. The phenol/aldehyde resin should preferably have a melt viscosity of at least 200 poises at 200° C. It may also be advantageous to convert the phenol/aldehyde resins into metal salts in order to increase the effectiveness of the flame-proofing combinations.

The following metals may be used for this salt formation: alkali metals and alkaline earth metals, zinc, cadmium, tin, lead, antimony, aluminium, copper, manganese, iron, cobalt and nickel. The resins may contain one or more of these metals. The metal salts may be prepared from, for example, the phenol/aldehyde resins and the oxides, hydroxides, carbonates, acetates, formates, phosphates or borates of the metals. Up to 15% by weight based on the resin of these metal compounds, preferably in the form of their oxides, may be added to the resins.

The phenol/aldehyde resins may also be grafted on the polyamide component of the moulding composition according to the present invention, for example if the cross-linking agent (for example a di-epoxide) has not yet reacted with the resin, or not completely reacted, and is therefore still capable of reacting with the polyamide when the flame-proofing agent is incorporated in the polyamide.

The polyamides which may be used for the moulding compositions according to the present invention are PA-6, PA-6,6 or mixtures thereof, block polyamides and copolymers of ε-caprolactam, adipic acid, hexamethylene diamine, PA-11, PA-12 and polyamides synthesized from aliphatic diamines and adipic acid and/or isophthalic acid and/or terephthalic acid and/or sebacic acid and/or azelaic acid and/or cyclohexane dicarboxylic acid.

Suitable aliphatic diamines include hexamethylene diamine, 2,2,4- and 2,4,4,-trimethyl-hexamethylene diamine, isophorone diamine, 1,3- and 1,4-bis-aminocyclohexane, bis-aminocyclohexyl-alkanes and xylylene diamines.

Polyamides which have been prepared from the above-mentioned aliphatic dicarboxylic acids and aromatic diamines such as m- and p-phenylene diamine may also be used, as well as polyamide mixtures and copolyamides of any of the components mentioned, providing that the polyamides obtained are aliphatic or partially aliphatic. The preferred polyamides are PA-6 and PA-6,6.

The average diameter of the phosphorus particles in the concentrates is $<200\mu$um, preferably $<100\mu$um, most preferably $<20\mu$um. The phosphorus used for the flame-proofing combination according to the present invention may be any of the commercial coloured allotropic forms of red phosphorus.

Preparation of the flame-proofing mixture or concentrate may advantageously be carried out by stirring the powdered red phosphorus into the molten resin or by incorporating it by kneading. The resin may be diluted with solvents during preparation of the concentrates, but this is not necessary according to the present invention. The apparatus used for preparing the concentrates may be stirrer vessels, kneaders or extruders.

The resin may be mixed as a powder with the phosphorus and the mixture may be pressed into pills or converted into a granulate, optionally with the aid of heat.

The preparation of the resin may also be carried out in the presence of phosphorus.

When the flame-proofing combinations according to the present invention are used, the evolution of toxic phosphorus-hydrogen compounds is exceptionally low. The liberation of such phosphines can be even further reduced by the addition of small quantities of $MoS_2$, HgO, $PbO_2$, CuO or ZnO.

Pigments and other additives may be incorporated in the polyamides, together with the flame-proofing mixtures or concentrates according to the present invention, using the conventional commercially available machines. Single screw or double screw extruders are preferred for this purpose.

Pigments for masking the red colour of the phosphorus and for adjusting a particular colour shade may either be present in the concentrates according to the present invention, together with the phosphorus, or incorporated into the moulding composition together with, or separately from the concentrates according to the present invention.

White pigments used for masking the red colour of the phosphorus are preferably $TiO_2$, ZnS or $BaSO_4$. They are used in quantities from 2 to 10 times, and preferably from 3 to 5 times the quantity of phosphorus in the moulding compositions. It is well known what quantities of additional pigments should be used to obtain certain colour shades.

Colour pigments, dyes, processing auxiliaries and stabilizers can be incorporated into the moulding compositions in the usual quantities. Preferred are carbon black, cadmium sulphide, phthalocyanines salts of stearic acid, talcum and sterically hindered phenols. Fillers and reinforcing substances are not added.

The moulding compositions according to the present invention may be processed into flame-proofed moulded articles using the conventional commercial injection moulding machines.

EXAMPLES

The following resins are prepared according to Houben-Weyl, Methoden der organischen Chemie, Volume 14/2, 4th Edition, Makromolekulare Stoffe II, page 273 et seq: (an adequate description of the production of phenol/aldehyde resins is disclosed in Kirk-Othmar, 2nd Edition, Vol. 15, page 182)

A. Novolak of phenol and formaldehyde; softening range 113–119° C. (page 273).

B. Novolak of p-phenyl-phenol and formaldehyde; softening range 87–123° C. (page 274).

C. Novolak of p-cresol and formaldehyde as described in experiment B, but using 600 g of p-cresol instead of 945 g of p-phenyl; softening range 78–112° C.

D. Novolak of resorcinol and formaldehyde; softening range 98–121° C. (page 274).

E. Novolak of phenol and acetaldehyde; softening range 117–122° C. (page 275).

F. Resol of phenol and formaldehyde; highly viscous resin at 20° C. (page 278).

The mixture was prepared in each case by stirring 33 parts by weight of red phosphorus into 67 parts of the molten resin. The resin was then cross-linked if desired and/or partly converted into a metal salt. Methods for preparing mixtures I–XIII are summarized in Table 1.

When the prepared concentrates were poured out on metal sheets, they rapidly solidified to form brittle products which could be easily reduced to particles having a diameter of from 2 to 4 mm.

Table 1

| | | | Preparation of mixtures I–XIII | | |
|---|---|---|---|---|---|
| | Resin | Resin Temp. °C. at the addition of red P | further additives, % by weight of sum of resin + red P | Resin Temp. at the addition of additives, °C. | Mixing Temp. when pouring out of reaction vessel °C. |
| I | A | — | Diepoxide*, 15 | 180 | 230 |
| II | A | — | Triethylphosphate, 3.5 | 150 | 245 |
| III | A | — | ZnO, 1,3 | 50 | 230 |
| IV | A | 150 | — | — | 180 |
| V | A | 150 | Diepoxide*, 3/$ZnCO_3$, 0.5 | 180 | 250 |
| VI | A | 150 | Boric acid, 0.5 | 180 | 250 |
| VII | A | 150 | CaO, 0.6 | 50 | 250 |
| VIII | B | 165 | $FeCO_3$, 2 | 180 | 250 |
| IX | C | 140 | Diepoxide, 3.5 | 170 | 230 |
| X | C | 140 | $H_3PO_4$, 0.3 | 150 | 235 |
| XI | D | 165 | Diepoxide*, 1.2 | 175 | 250 |

I, II, III: Comparison experiments

Table 1-continued

| | Resin | Resin Temp. °C. at the addition of red P | Preparation of mixtures I-XIII further additives, % by weight of sum of resin + red P | Resin Temp. at the addition of additives, °C. | Mixing Temp. when pouring out of reaction vessel °C. |
|---|---|---|---|---|---|
| XII | E | 170 | Diepoxide*, 1.8 | 190 | 240 |
| XIII | F | 150 | Tolylenediisocyanate, 1.7 | 180 | 200 |

*Diglycidyl ether of 2,2-bis-(4-hydroxyphenyl)-propane (bisphenol A)

EXAMPLES 1-21

The incorporation of mixtures I-XIII into polyamide-6,6 having a relative solution viscosity of 3.03 (determined on a 1% solution in m-cresol at 25° C.), optionally together with pigments and auxiliary agents, is carried out in a single shaft extruder manufactured by Reifenhauser. This has a screw diameter D of 30 mm and a screw length of 20 D. The compositions, conditions of incorporation and the flame resistance of the mixtures are summarized in Table 2.

ASTM test rods measuring about $1.5 \times 12.5 \times 127.5$ and $3 \times 12.5 \times 127.5$ mm were extruded to test the flame resistance of the moulding compositions according to UL, Subj. 94.

Table 2

Composition of flame-proofed polyamide-6,6 moulding compositions

| Example | Concentrate/ % by weight | Further additives/ % by weight | Mass Temp. °C. | % by weight red P in moulding composition | % by weight phenol resin in moulding composition | flame resistance according to UL, Subj. 94 thickness of test rod 1.5 mm | 3 mm | Colour |
|---|---|---|---|---|---|---|---|---|
| 1 +) | — | — | — | — | — | V 2 | V 2 | colourless |
| 2 +) | A/10 | — | 275 | — | 10 | burns down | burns down | beige |
| 3 +) | Red P as concentrate in PA-6,6 (incorporated by polymerisation) | — | 275 | 2 | — | burns down | burns down | red |
| 4 +) | | — | 275 | 6 | — | burns down | burn down | red |
| 5 +) | Red P enveloped according to Example 5 of DAS 2 625 691/3 | — | 275 | 2 | 1 | burns down | burns down | red |
| 6 +) | /9 | — | 275 | 6 | 3 | V 1 | V 1 | red |
| 7 +) | I/10 | — | 275 | — | 10 | burns down | burns down | beige |
| 8 +) | II/10 | — | 275 | — | 10 | burns down | burns down | beige |
| 9 +) | III/10 | — | 275 | — | 10 | burns down | burns down | beige |
| 10 | IV/6 | — | 275 | 2 | 4 | V 1 | V 1 | red |
| 11 | V/6 | — | 275 | 2 | 4 | V 1 | V 0 | red |
| 12 | V/8 | — | 275 | 2.66 | 5.34 | V 0 | V 0 | red |
| 13 | V/6 | A/2 | 275 | 2 | 6 | V 0 | V 0 | red |
| 14 | VI/6 | — | 275 | 2 | 4 | V 1 | V 1 | red |
| 15 | VII/6 | — | 275 | 2 | 4 | V 1 | V 1 | red |
| 16 | VIII/6 | — | 275 | 2 | 4 | V 0 | V 0 | red |
| 17 | IX/6 | TiO$_2$/6 | 280 | 2 | 4 | V 1 | V0 | light pink |
| 18 | X/6 | TiO$_2$/6 | 280 | 2 | 4 | V 0 | V 0 | light pink |
| 19 | XI/6 | TiO$_2$/6 | 280 | 2 | 4 | V 0 | V 0 | light pink |
| 20 | XII/6 | TiO$_2$/6 | 280 | 2 | 4 | V 1 | V 0 | light pink |
| 21 | XIII/6 | ZnS/10 | 280 | 2 | 4 | V 1 | V 1 | light pink |

+) comparison example

EXAMPLES 22-25

Various polyamides were flame-proofed using concentrate V as indicated in the previous examples. The composition of the mixtures and the results of the flame resistance tests are summarized in Table 3.

Table 3

Composition of the flame-proofed polyamide moulding compositions

| Example | polyamide components /% by weight in moulding composition | concentrate/ % by weight in moulding composition | further additives/ % by weight | Mass Temp. °C. | % by weight red P in moulding composition | % by weight phenol resin in moulding composition | flame resistance according to UL, Subj. 94 thickness of test rods 1.5 mm | 3 mm | colour |
|---|---|---|---|---|---|---|---|---|---|
| 22 | PA-6, η rel = 3.07 / 92 | V/8 | — | 260 | 2.66 | 5.34 | V 1 | V 0 | red |
| 23 | PA-6,6 η rel = 3.96 / 88 | V/6 | TiO$_2$/6 | 285 | 2 | 4 | V 0 | V 0 | light pink |
| 24 | PA of isophthalic acid + hexamethylene diamine, η rel % 2.64/92 | V/8 | — | 265 | 2.66 | 5.34 | V 0 | V 0 | red |
| 25 | mixture of 50% PA-6, η rel = 3.07 u. | V/8 | TiO$_2$/6 | 275 | 2.66 | 5.34 | V 1 | V0 | light pink |

Table 3-continued
Composition of the flame-proofed polyamide moulding compositions

| Example | polyamide components /% by weight in moulding composition | concentrate/ % by weight in moulding composition | further additives/ % by weight | Mass Temp. °C. | % by weight red P in moulding composition | % by weight phenol resin in moulding composition | flame resistance according to UL, Subj. 94 thickness of test rods 1.5 mm | 3 mm | colour |
|---|---|---|---|---|---|---|---|---|---|
| | PA-6,6 η rel = 3.03 | | | | | | | | |

What we claim is:

1. A flame-proofed, unreinforced, unfilled polyamide moulding composition containing as a flame-proofing combination 0.5 to 25% by weight of a mixture of:
   a. from 55 to 95% by weight of at least one phenol-/aldehyde condensation resin and
   b. from 5 to 45% by weight of red phosphorus having an average particle size below 200 μm.

2. A flame-proofed moulding composition as claimed in claim 1, containing from 3 to 12% by weight of the flame-proofing combination.

3. A flame-proofed moulding composition as claimed in claim 1 containing a mixture of 60 to 80% by weight of component (a) and 20 to 40% by weight of component (b).

4. A flame-proofed moulding composition as claimed in claim 1 wherein the phenol/aldehyde condensation resin is a novolak.

5. A polyamide moulding composition as claimed in claim 1, wherein the phenol/aldehyde condensation resin contains up to 25% by weight of a cross-linking agent.

6. A polyamide moulding composition as claimed in claim 1, wherein up to 15% by weight of a metal compound is added to the phenol/aldehyde condensation resin, said metal compound being an oxide, hydroxide, carbonate, acetate, formate, phosphate or borate of an alkali metal, an alkaline earth metal, zinc, cadmium, tin, lead, antimony, aluminum, copper, manganese iron, cobalt or nickel.

7. A polyamide moulding composition as claimed in claim 5, wherein the crosslinking agent is a polyfunctional epoxide, phosphoric acid or boric acid.

8. A polyamide moulding composition as claimed in claim 6, wherein the metal compound is a metal oxide.

9. A light coloured, flame-proofed, unreinforced, unfilled polyamide moulding composition as claimed in claim 1 containing a white pigment in quantities of 2 to 10 times the quantity of phosphorus.

* * * * *